United States Patent
Wise

[11] 3,843,169
[45] Oct. 22, 1974

[54] COUPLING FOR HOSE, PIPE, TUBING OR THE LIKE

[76] Inventor: Carleton H. Wise, K. O. Machine & Tooling Co.; 324 S. Kidd St., Whitewater, Wis. 53190

[22] Filed: May 24, 1972

[21] Appl. No.: 256,269

[52] U.S. Cl............ 285/39, 85/61, 285/247, 285/322, 285/331, 285/156, 285/423
[51] Int. Cl............................ F16l 35/00
[58] Field of Search .......... 85/61, 62, 32 R; 285/39, 285/247, 243, 382–387, 322, 323, 331, 371, 343, 156, 423

[56] References Cited
UNITED STATES PATENTS

| 927,388 | 6/1909 | Watkins et al. | 285/243 |
| 1,735,663 | 11/1929 | Ansel | 285/322 |
| 1,844,023 | 2/1932 | Terry | 285/243 |
| 2,490,620 | 12/1949 | Cole et al. | 285/382.7 X |
| 2,877,027 | 3/1959 | Bagnell | 285/243 X |
| 3,104,899 | 9/1963 | McKenzie | 285/343 |
| 3,485,517 | 12/1969 | Howe | 285/341 |
| 3,640,551 | 2/1972 | Shakesby | 285/39 |
| 3,659,881 | 5/1972 | Tinsley et al. | 285/331 |

FOREIGN PATENTS OR APPLICATIONS

| 663,237 | 4/1964 | Italy | 285/323 |

Primary Examiner—Dave W. Arola
Attorney, Agent, or Firm—Neuman, Williams, Anderson & Olson

[57] ABSTRACT

A coupling for hose, pipe, tubing or the like fabricated from a combination of inexpensive, easily moldable material and rigid inserts is disclosed which comprises a housing with threaded, slotted end portions capable of compression by a tapered nut and a coaxial inner rigid insert whereby a hose or other conduit may be securely locked between the housing and gripping edges of the insert providing a positive seal and protection from pull out while retaining substantially unrestricted flow of fluid therethrough.

18 Claims, 10 Drawing Figures

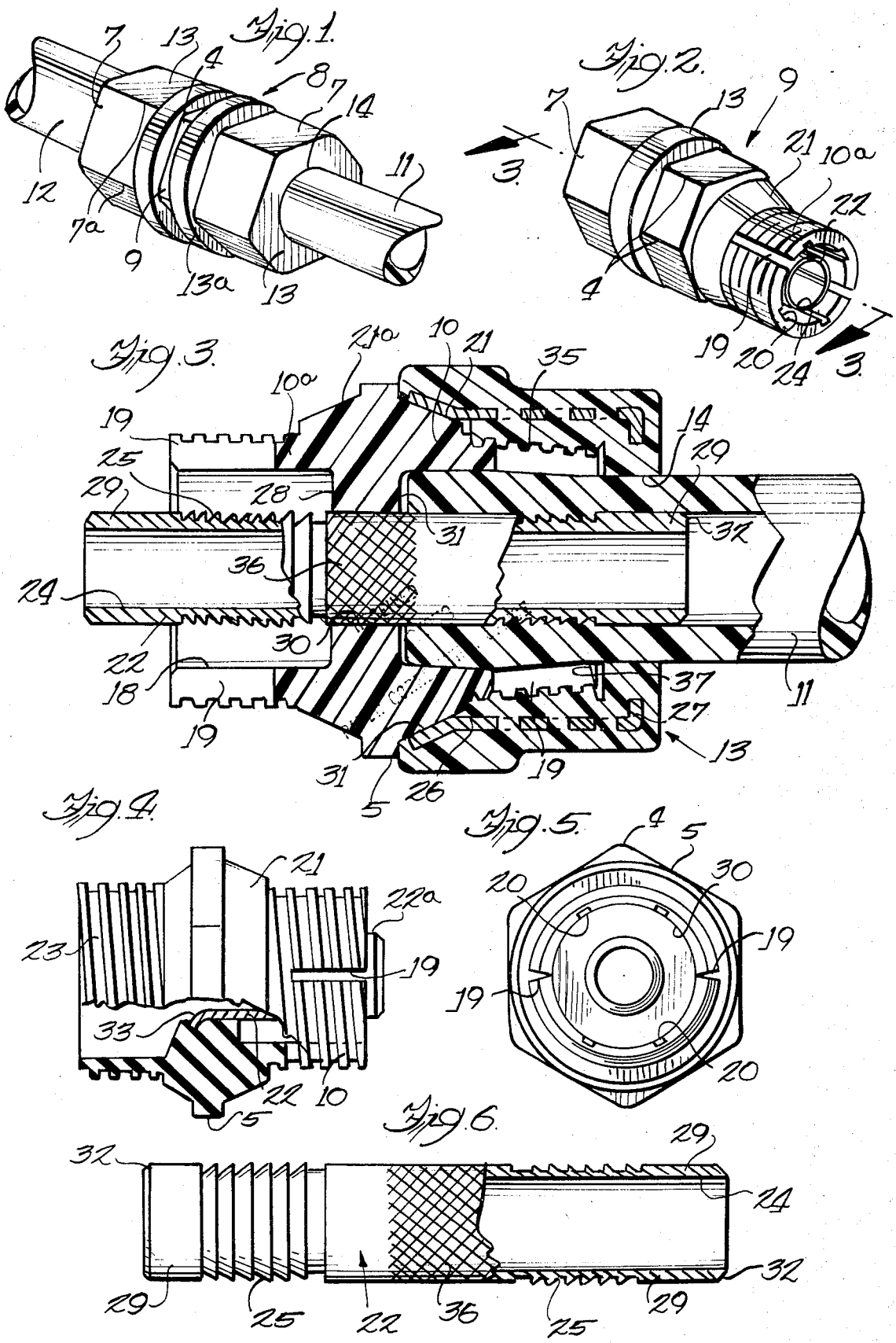

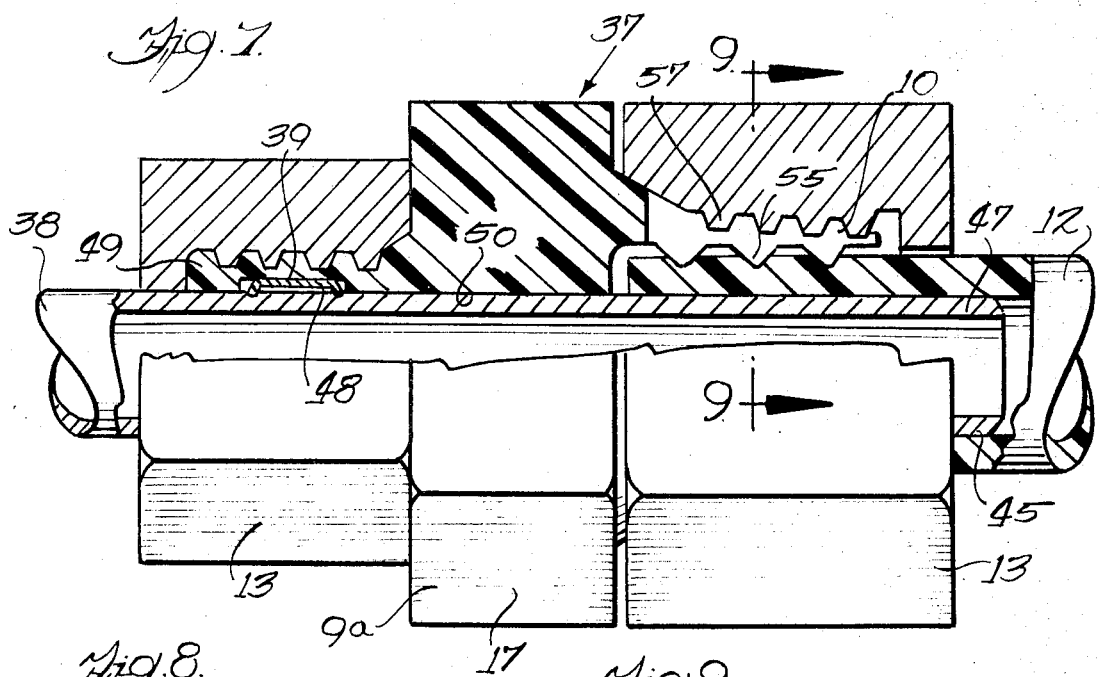
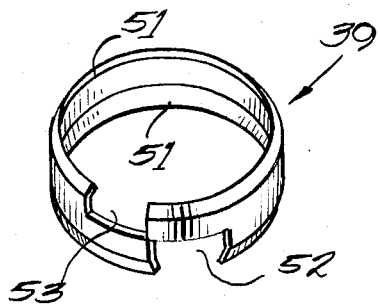
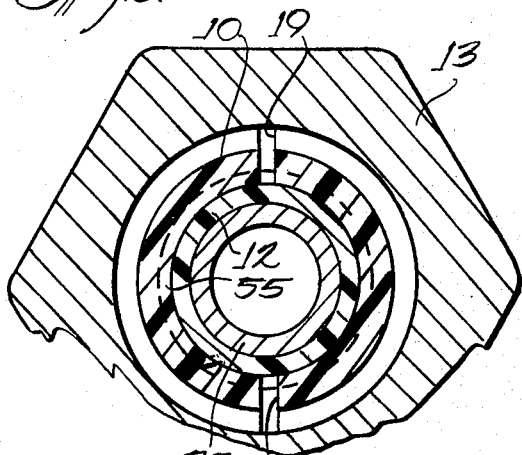
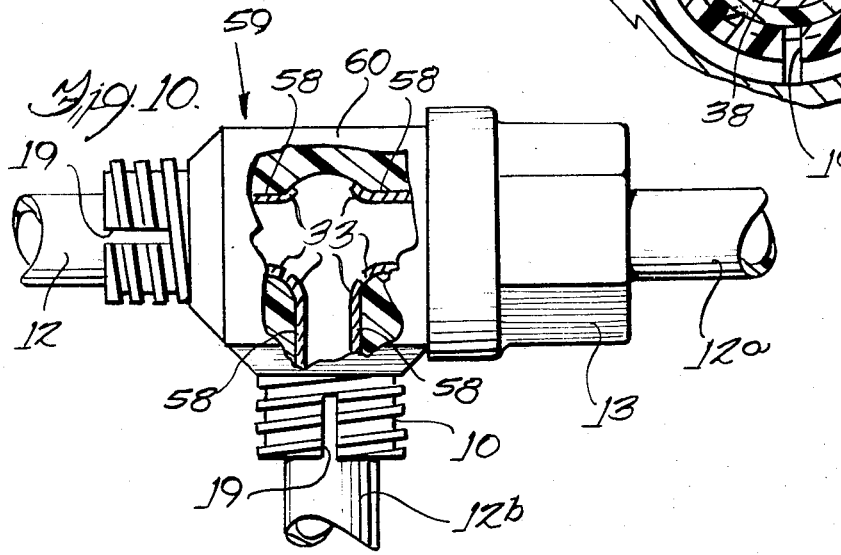

COUPLING FOR HOSE, PIPE, TUBING OR THE LIKE

BACKGROUND OF THE INVENTION

The field of the invention relates, in general, to couplings for conduits such as hoses, tubing, pipes and the like. More specifically, the invention relates to a coupling which may be easily and inexpensively manufactured while providing a strength and versatility which has been hitherto unattainable.

In the past, both the manufacture and the use of hose couplings, or fittings as they are commonly called, have had certain inadequacies. Previously, attempts to use inexpensive materials such as moldable plastics have failed in that the plastics fractured easily if the walls were too thin and had restricted flow when the walls were too thick. Also, the ability of the coupling to grip the conduit was marginal or the costs were prohibitive.

A common type of fitting in present use requires a special tool to effect coupling with the concomitant difficulty of having the tools available where needed and added expense.

One attempt to solve some of the difficulties with plastic fittings is exemplified in U.S. Pat. No. 2,179,930 issued to G. P. Harrington. The failure of devices which use moldable and yieldable materials such as plastics exclusively in their construction is in the inherent inability of the material to maintain refined configuration without fracture, i.e., sharp edges secure better than rounded ones and, thus, the gripping of the associated conduits was inadequate.

Another difficulty with fittings previously known has been the deterioration of the material of an inexpensive fitting when left exposed for a number of years to the external environment.

Finally, there has been no single design capable of application to a variety of sizes, range of materials, types of conduits and variable environments.

SUMMARY OF THE INVENTION

It is, therefore, a primary object of this invention to provide a coupling which provides a high degree of reliability and yet is easy to manufacture.

It is a further object of the present invention to provide a coupling which may be used with the normal range of common hand tools.

It is a still further object of the present invention to provide a fitting which is adaptable for use with either plastic or metal hoses, tubing and pipes and is capable of interconnecting a variety of such conduits in a single system.

Another object of the invention is to provide a fitting which is capable of withstanding long periods of exposure to the elements.

Still another object of the present invention is to provide a versatile fitting which may be easily adapted for use with a variety of conduit sizes.

In one exemplary embodiment of the present invention, there is provided a coupling for interconnecting conduits including a molded plastic housing having a central portion with an inner diameter substantially equal to the inner diameter of the conduit and two threaded outer portions on said housing containing a plurality of slots; a rigid insert with an outer diameter corresponding to the inner diameter of the middle portion whereby the insert may be rigidly assembled therein, the insert having a plurality of serrations along each end portion to embed in the conduit and a lock nut generally cylindrical having threads along the inner, but tapered surface to engage and compress the threaded portion of the housing to press the threaded portion inwardly against the conduit which in turn engages the serrated portion of the insert.

BRIEF DESCRIPTION OF THE DRAWINGS

Reference will now be made to the accompanying drawings in which:

FIG. 1 is a perspective view of an exemplary embodiment of the present invention showing the coupling interconnecting two similar conduits;

FIG. 2 is a perspective view of the embodiment of FIG. 1 showing one end of the coupling with the locking nut removed;

FIG. 3 is a side view, in section, of the apparatus of FIGS. 1 and 2 taken along the section line 3—3 of FIG. 2 illustrating the positioning of a conduit in the coupling;

FIG. 4 is a side view of the housing forming a part of the embodiment of FIG. 3 partially in section;

FIG. 5 is an end view of the housing of FIG. 4;

FIG. 6 is an elevational view, partially in section, of the insert which forms a part of the embodiment of FIG. 3;

FIG. 7 is a partial fragmentary view of a coupling embodying the principles of the invention adapted to interconnect a metallic tubing and a plastic hose;

FIG. 8 is a perspective view of a metal ferrule forming a part of the embodiment of FIG. 7;

FIG. 9 is a sectional view, partly broken away, taken along line 9—9 of FIG. 7; and FIG. 10 is a plan view of a three conduit coupling, partially broken away, to show the attachment of the rigid inserts.

Referring now to FIG. 1, a coupling 8 embodying the invention is shown with the locking nuts 13 and 13a tightened onto the housing 9. In this embodiment, the coupling 8 is joining the ends of the two flexible hoses 11 and 12 together in end-to-end relationship. The coupling provides both for a sealed interconnection and a firm mechanical linkage. In the particular embodiment described, the housing 9 and the locking nuts 13 and 13a are molded of a thermoplastic resin manufactured by General Electric Company and known as VALOX. The material is a crystalline polymer combining excellent surface properties, fatigue endurance and solvent resistance with good mechanical and electrical properties. It has also been found to possess good lubricity and a Rockwell hardness measured on the R scale of 117 providing advantages in the instant invention. It may or may not be filled and reinforced with glass filler material.

In the embodiment of FIG. 1, each locking nut 13 and 13a has an hexagonal portion 7 which is adapted for engagement and manipulation with a wrench or similar tool to assemble the coupling and tighten the nut to form a seal. The longitudinal edges 7a of the locking nuts are intertionally rounded to prevent the sharp edges from fracturing. The rounded edges 7a also insure tool slippage in assembly and, thus, prevent overtightening. Thus, by using a satisfactory molded plastic and the proper design and dimensional criteria, the locking nut 13 and 13a is itself torque-limiting precluding the need for a torque wrench or the like. For example, a coupling for 5/8 inch O.D. plastic pipe has a locking nut with an hexagonal portion 7 of approximately 1½ inches across its maximum transverse dimension between opposed rounded edges 7a. In this embodiment, rounded edges with an edge radius between about 3/16 inch and ¼ inch have proven highly effective.

In the preferred embodiment, the housing 9 also has an hexagonal or other irregular portion 5 to facilitate tool engagement and it, too, has the round corners 4 for torque limiting.

The housing 9 comprises, in addition to the central portion 5, two threaded ends 10 and 10a shown in FIG. 2, 3 and 4. A slope 21 and 21a is provided on the middle portion connecting the tool engageable portion with the threaded ends 10 and 10a (shown in FIG. 2) providing extra strength to the housing and an auxiliary sealing and locking face as well as facilitating removal from the mold. A passageway 14 is provided in a flange portion of the locking nut 13 of a diameter approximately equal to the conduit to be coupled.

Referring now to FIG. 2, a perspective view of the coupling is shown with the locking nut 13 removed revealing the threaded end 10a. The threads 12 may be of any desired type, but preferably a standard. A standard 60 degree stub thread is shown and it provides a measure of strength to the threads not attainable with sharper threads. Shown on the exposed threaded end 10a and also present on the end 10 shown covered are the slots 19 and 20 as shown best in FIGS. 4 and 5. The slots 19 are full slots having a width depending on the size of the coupling, but generally the slots have a circumferential dimension in the range of 30 to 80 thousandths of an inch. The actual size of the slots will depend upon other parameters such as the size of the coupling and type of hose material. The slots 19 will be compressed during tightening of the locking nut 13 as will be more fully explained subsequently. Cooperating with the slots 19 are the partial slots 20, also of a size in the 30 to 80 thousandths range, which facilitate compression of the threaded end 10 and their operation, too, will be explained subsequently. The partial slots 20 preferably extend about two-thirds of the radial distance through the housing wall.

Also shown in FIG. 2 is an insert 22 having an inner diameter 24 which may be substantially equal to that of the conduit coupled to it. The relatively large inner diameter 24 improves fluid flow. Nevertheless, a compact overall coupling is made possible by selecting a sufficiently strong and rigid material for the insert 22 such as copper or steel. The detailed working of, and cooperation between insert 22 (shown fully in FIGS. 3 and 6) and compression of the threaded ends 10 will be explained hereinafter.

FIG. 3 illustrates, in cross section, the positioning of the insert 22 within the housing 9. Attachment of the insert 22 to the housing 9 is accomplished along the inner diameter 30 of the central portion 5 by either molding the insert in place, or, as in the preferred embodiment, by providing the insert with a raised or knurled portion 36 which will grip the inner diameter 30 of central portion 5 along its length. The strength of the attachment of the insert 22 to the housing 9 is not critical following assembly since, when two conduits 11 and 12 are attached at their respective ends, any force tending to pull one hose out will pull the other hose up against a stop 28 formed in housing 9. The distal ends of the insert 22 are provided with gripping edges 25 and extensions 29.

The edges 25 may be of any irregular shape, as the radial pressure on the house or plastic pipe will force the conduit material into the grippers 25. However, as shown, sawtooth indentations are preferred. As shown, the threads 35 of the nut taper down to a smaller diameter 37 so that when the nut 13 is tightened onto the threaded end of the housing, a compression force is produced tending to push together the cantilevered end portions defined by slots 19 and 20. A hose 11, made of any tough, somewhat pliable material such as extruded plastic is positioned between the inner diameter 18 of the threaded portion 10, which is closing down as shown in FIG. 3. As the nut 13 tightens, the outside of the metal insert 22 containing the gripping edges 25 will receive the inner surface of the conduit 11, imbedding the gripping edges 26 into the conduit. The gripping edges 25, being rigid and preferably metal, will bite into the softer material of the conduit 11 and the slanted edges (barbs) 25 will prevent the conduit from inadvertent removal. Using the above-described insert 22, the amount of force required to pull a plastic pipe out once it has been properly attached has been found to be greater than, or at least equal to the tensile strength of the pipe itself. It is thus a simple matter for an operator, using conventional tools, urge a plastic pipe over the insert 22, position the conduit against the stop 28, tighten the locking nut 13 and thus produce a tight seal locked against leakage and inadvertent removal. The entended end 29 of the insert 22 is provided as a strengthening aid and helps to prevent fracture of the hose near the coupling. It preferably extends a fraction of an inch beyond the restricted end 14 of nut 13 to produce a bending radius in the pipe.

Also as shown in FIG. 3, a metal stiffener 26 is preferably molded into the locking nut 13 for added protection against fracture of the nut 13 when torque is applied to it. The stiffener 26 is preferably of perforated construction so as to allow plastic fibers to mold through it and insure proper bonding inside the locking nut 13. As shown in FIG. 3, the insert 26 has an annular end 27 which further strengthens the locking nut 13, but may be omitted if desired for ease of manufacture. Also, the sloping distal end 31 of insert 26 is of substantial assistance in molding the nut 13 and also provides a rigid conical locking and sealing surface against conical surface 21 of housing 9. However, the conic portion 31 may be omitted, if desired.

FIG. 5 illustrates the configuration of the housing when under compression. The full slots 19 permit the contraction of the threaded end 10 to an effectively smaller diameter. The partial slots 20 assist in a partial reshaping of the end 10, forming the double half moon shape depicted. This allows the forces to be distributed relatively uniformly about the circumference of the end 10. Another added advantage of providing some partial slots rather than full slots throughout is a resultant ease of molding. It is far easier to build and operate a mold and core utilizing the configuration described. For some smaller fittings, it is possible to provide the full slots 19 as shown and eliminate the partial slots entirely.

FIG. 6 shows the detailed configuration of the metal insert 22. Extensions 29 are shown on both ends containing a chamfer 32 to prevent the premature failure of a plastic hose or pipe against a sharp edge on the insert. A four degree chamfer has proven satisfactory. The gripping edges 25 will embed themselves in the plastic hose 12 (as in FIG. 1) when the compression force of the locking nut 13 is applied. The middle portion 36 of the insert is knurled so as to insure a firm fit in the middle diameter 30 (shown in FIGS. 3 and 5) whether the insert 22 is molded in place or driven.

FIG. 4 illustrates a male fitting embodying the principles of the invention. Shown are the threaded ends 10 and 23. The end 10 is exactly as described above in the standard embodiment (FIGS. 1–3). The end 23 is adapted for direct coupling to a female pipe fitting. The insert 22a is the same as insert 22 except that it is secured to the housing 9 by flair 33. Locking nut 13 will secure a hose to the end 10 and attachment is accomplished as above.

FIGS. 7–9 illustrate different aspects of another embodiment of the present invention. The coupling 37 illustrated in these figures encompasses a conduit coupling which will accommodate a plastic pipe 12 and metal tubing 38.

Specifically, with reference to FIG. 7, a housing 9a is provided with a middle portion 17, and two threaded end portions 10 and 49. The operation and construction of the end 10, with a locking nut 13, is similar to that previously described. Likewise, the basic construction of the end 49 is similar with the exception of the space 48 used to accommodate a metal ferrule 39.

Again with reference to FIG. 7, the attachment of the two conduits 12 and 38 is accomplished as follows: The conduit 38 is a length of relatively rigid, but yieldable and bendable, tubing such as conventional copper tubing. The metal tubing 38 is slideably inserted through the housing inner diameter 50 so as to provide an extending portion 47. The plastic hose or pipe 12 is then inserted over the metal tubing 38 until it rests against the stop 28. In this embodiment, annular rings 55 are preferably formed on the inner wall of threaded end 10 to engage plastic pipe 12 and form a lock. With this configuration, adequate strength is attained without the sawtooth gripping portion 25 of the metal insert 22 as shown in the embodiment of FIG. 3.

The two locking nuts 13 are tightened onto the threaded ends 10 and 49 in the manner already described. The taper 57 of the nuts forces the slots 19 (shown in FIG. 9) to close, thereby decreasing the inner diameter of the threaded portion 10. The metal ferrule 39 in end 49 will be forced into the metal tubing 38 when the locking nut 13 is tightened onto the end 49. On the end 10, the plastic pipe 12 will be forced securely against the metal pipe 38 and its extension 47 along the interface 45 as well as against annular rings 55. The size of the rings 55 is such that during the molding operation of the housing 37, a single core may be removed from the mold easily without movable or collapsible multiple cores.

FIG. 8 is a perspective view of the ferrule 39. The significant physical features are the edges 51 which grip the metal pipe and the interlocking L-shaped split opening 52 and 53 which allows the ferrule to be compressed during insertion and snapped into place in the groove 48 in the threaded end 49.

Another embodiment of the present invention comprising a three-way connector 59 is depicted in FIG. 10. Three hoses 12, 12a and 12b may be connected in a single housing 60 having three metal inserts 58. The inserts 58 are similar to the ones used for a single ended plastic hose coupling (shown in FIG. 4), and are molded into the housing 60. The inserts are secured against pull-out by the flanges 33. The same locking nut 13, as previously described, is used over the threaded ends 10 (one shown) pushing together the slots 19 and 20.

While several particular embodiments have been described in detail, this is primarily to suggest the various combinations of the unique couplings which are available to one skilled in the art in view hereof. For example, a four conduit coupling can be built or the coupling can be built for tubing-to-tubing coupling in which event the configuration shown on the left side of FIG. 7 would be duplicated on the right.

The configurations and combinations taught herein have been found to exhibit surprising strength, fatigue life, inertness, low fluid flow resistance all at reduced cost for materials and fabrication.

I claim:

1. In a coupling for a yieldable fluid conduit, housing means integrally molded of resilient material, said housing means including a central portion having a central fluid passageway of predetermined diameter extending therethrough and an end portion extending from said central portion and having an end fluid passageway extending therethrough, said central and said end passageways being coaxially aligned, a cylindrical insert having substantially greater rigidity than said housing having an outer diameter substantially equal to the inner diameter of said fluid conduit and disposed within said central fluid passageway, the inner diameter of said central fluid passageway being substantially equal to the outer diameter of said insert whereby said insert is retained against axial movement within said central fluid passageway, said insert extending outwardly into said end portion, said end portion having an inner diameter substantially equal to the outer diameter of the fluid conduit whereby the fluid conduit fits over said insert within said end portion, the outer surface of said end portion being threaded, a locking member having a threaded central aperture, said threaded central aperture being adapted to engage the threaded surface of said end portion, said threaded portion and said threaded aperture having a tapered relationship whereby tightening said locking member onto said end portion compresses said end portion and resiliently deforms said fluid conduit between said end portion and said insert, said locking member having a radially extending flange portion extending inwardly from the distal portion of said locking member, said flange portion having an inner diameter generally equal to the outer diameter of said fluid conduit, and means on said insert gripping and retaining the yieldable fluid conduit against longitudinal movement of the fluid conduit relative to the housing means.

2. The coupling of claim 1 wherein said insert extends outwardly beyond said end portion.

3. The coupling of claim 1 wherein said insert is provided with said axial clamping means having a recticular surface within said end portion to enhance the clamping of said fluid conduit therebetween.

4. A coupling according to claim 1 adapted for assembly with a torque-applying tool wherein the outer surface of said locking member is provided with a plurality of generally flat faces lying in planes generally parallel to said fluid passageways, the junctions between said flat faces being blended to allow a torque-applying tool to slip thereacross when said torque-applying tool is engaged with said flat faces and a predetermined torque is exceeded.

5. The coupling of claim 1 adapted to interconnect a relatively nonresilient conduit to a resilient conduit wherein said housing has a second end portion axially aligned with said end portion and centrally apertured to receive said relatively nonresilient conduit, said relatively nonresilient conduit extending through said central portion and into said end portion to comprise said insert.

6. The coupling of claim 1 wherein said housing includes a second end portion having a third fluid passageway aligned with said central and end fluid passageways, said second end portion being threaded for threaded attachment to a rigid nonyieldable and threaded conduit.

7. The coupling of claim 1 wherein said housing includes a second end portion having the features of said end portion as set forth in claim 1, said end portion and said second end portion being aligned and a rigid insert with a second end extending through said central portion and from said end portion to said second end portion, a second locking member as set forth in claim 1 engagin said second end portion to resiliently deform a second resilient fluid conduit between said second end portion and said insert.

8. A coupling having a housing as set forth in claim 1 and having a plurality of end portions, relatively rigid inserts and locking members extending therefrom and mounted thereon, and a central cavity within said central portion communicating with each of said end portions.

9. The coupling of claim 1 wherein said housing and said locking means are molded of a plastic material reinforced with a metallic.

10. A coupling connecting a fluid conduit which is bendable transversely of its longitudinal axis to follow serpentine paths and generally nonresilient to a resilient conduit having an inside diameter substantially equal to the outside diameter of said fluid conduit, said coupling comprising housing means integrally molded of resilient material, said housing means including a central portion having a central fluid passageway extending therethrough, a first end portion extending from said central portion and having an end fluid passageway therein, an annular recess in said end fluid passageway, a split annular clamping ring disposed in said annular recess, said clamping ring having inwardly directed gripping portions and interlocking edges at the split for resisting longitudinal movement, and locking means threadedly engaging said end portion, surrounding said end portion and compressing said end portion and said clamping means inwardly, said end portion having an internal diameter substantially equal to the outer diameter of the fluid conduit whereby said conduit is clamped within said end portion by said clamping means by the threaded compression of said end portion by said locking means, and said coupling having a second end portion and clamping means aligned with said first end portion clamping said resilient conduit in sealing relationship surrounding said fluid conduit.

11. The coupling of claim 1 wherein said housing means has an outer conic surface adjacent said end portion and said locking means has a cooperating conic surface engageable therewith.

12. In a coupling for a yieldable fluid conduit, housing means integrally molded of resilient material, said housing means including a central portion having a central fluid passageway of predetermined diameter extending therethrough and an end portion extending from said central portion and having an end fluid passageway extending therethrough, said central and said end passageways being coaxially aligned, a cylindrical rigid insert having an outer diameter substantially equal to the inner diameter of said fluid conduit and disposed within said central fluid passageway, the inner diameter of said central fluid passageway being substantially equal to the outer diameter of said insert whereby a portion of said insert is retained against movement within said central fluid passageway, said insert extending outwardly into said end portion, said end portion having an inner diameter substantially equal to the outer diameter of the fluid conduit whereby the fluid conduit fits over said insert within said end portion, the outer surface of said end portion being threaded, a locking member having a threaded central aperture, said threaded central aperture being adapted to engage the threaded surface of said end portion, said threaded portion and said threaded aperture having a tapered relationship whereby tightening said locking member onto said end portion compresses said end portion and resiliently deforms said fluid conduit between said end portion and said insert, said locking member having a radially extending flange portion extending inwardly from the distal portion of said locking member, said flange portion having an inner diameter generally equal to the outer diameter of said fluid conduit, said end portion being slotted longitudinally and including longitudinally extending recesses in a surface thereof extending partially through said end portion, said recesses and slotted portions cooperating to enhance the resilient deformation of said end portion.

13. In a coupling for a yieldable fluid conduit, housing means integrally molded of resilient material, said housing means including a central portion having a central fluid passageway of predetermined diameter extending therethrough and an end portion extending from said central portion and having an end fluid passageway extending therethrough, said central and said end passageways being coaxially aligned, a cylinderical rigid insert having an outer diameter substantially equal to the inner diameter of said fluid conduit and disposed within said central fluid passageway, the inner diameter of said central fluid passageway being substantially equal to the outer diameter of said insert whereby a portion of said insert is retained against movement within said central fluid passageway, said insert extending outwardly into said end portion, said end portion having an inner diameter substantially equal to the outer diameter of the fluid conduit whereby the fluid conduit fits over said insert within said end portion, the outer surface of said end portion being threaded, a locking member having a threaded central aperture, said threaded central aperture being adapted to engage the threaded surface of said end portion, said threaded portion and said threaded aperture having a tapered relationship whereby tightening said locking member onto said end portion compresses said end portion and resiliently deforms said fluid conduit between said end portion and said insert, said locking member having a radially extending flange portion extending inwardly from the distal portion of said locking member, said flange portion having an inner diameter generally equal to the outer diameter of said fluid conduit, the outer surface of said locking member provided with a plurality of generally flat faces lying in planes generally parallel to said fluid passageways, the junctions between said flat faces being blended to allow a torque-applying tool to slip thereacross when said torque-applying tool is engaged with said flat faces and a predetermined torque is exceeded.

14. The coupling of claim 1 wherein the locking member is molded of yieldable material and has an annular metallic reinforcing ring molded therein.

15. In a coupling for a yieldable fluid conduit, housing means integrally molded of resilient material, said housing means including a central portion having a central fluid passageway of predetermined diameter extending therethrough and an end portion extending from said central portion and having an end fluid passageway extending therethrough, said central and said end passageways being coaxially aligned, a cylindrical rigid insert having an outer diameter substantially equal to the inner diameter of said fluid conduit and disposed within said central fluid passageway, the inner diameter of said central fluid passageway being substantially equal to the outer diameter of said insert whereby a portion of said insert is retained against movement within said central fluid passageway, said insert extending outwardly into said end portion, said end portion having an inner diameter substantially equal to the outer daimeter of the fluid conduit whereby the fluid conduit fits over said insert within said end portion, the outer surface of said end portion being threaded, a locking member having a threaded central aperture, said threaded central aperture being adapted to engage the threaded surface of said end portion, said threaded portion and said threaded aperture having a tapered relationship whereby tightening said locking member onto said end portion compresses said end portion and resiliently deforms said fluid conduit between said end portion and said insert, said locking member having a radially extending flange portion extending inwardly from the distal portion of said locking member, said flange portion having an inner diameter generally equal to the outer diameter of said fluid conduit, said housing having a second end portion axially aligned with said end portion and centrally apertured to receive said relatively yieldable conduit, a relatively nonresilient conduit extending through said central portion into said end portion to comprise said insert.

16. The coupling of claim 15 wherein said second end portion has a threaded outer surface and is resilient and including a locking member having a threaded aperture engaging said second end portion to clamp said relatively rigid conduit therein.

17. The coupling of claim 16 wherein said second end portion has an annular recess therein, a second end clamping means being disposed in said annular recess and engageable with said relatively nonresilient conduit to lock said relatively nonresilient conduit against longitudinal movement therein.

18. The coupling of claim 17 wherein said second end clamping means comprises a resilient expandable annular ring having inwardly directed gripping portion to positively engage and lock said relatively nonresilient conduit.

* * * * *